United States Patent [19]

Hasuo et al.

[11] Patent Number: 4,680,374

[45] Date of Patent: Jul. 14, 1987

[54] OPTICAL DISC SUBSTRATE MADE OF A COPOLYCARBONATE

[75] Inventors: Masayoshi Hasuo, Yokohama; Seiichi Mukai, Kunitachi; Hiroshi Urabe; Seiji Yoshida, both of Kawasaki; Masahiro Nukui, Sagamihara, all of Japan

[73] Assignee: Mitsubishi Chemical Industries Ltd., Tokyo, Japan

[21] Appl. No.: 765,802

[22] Filed: Aug. 15, 1985

[30] Foreign Application Priority Data

Aug. 24, 1984 [JP] Japan ................... 59-175078

[51] Int. Cl.4 ............................. C08G 63/62
[52] U.S. Cl. .................... 528/204; 428/412; 524/611; 528/196
[58] Field of Search .................. 528/196, 204

[56] References Cited

U.S. PATENT DOCUMENTS 4,304,899 12/1981 Mark et al. .................... 528/196
4,495,345 1/1985 Kawakami et al. ............. 528/196
4,529,791 7/1985 Glass ............................. 528/196

FOREIGN PATENT DOCUMENTS 89801 9/1983 European Pat. Off. .
3343898 6/1984 Fed. Rep. of Germany .
2377267 11/1978 France .

Primary Examiner—Harold D. Anderson
Attorney, Agent, or Firm—Oblon, Fisher, Spivak, McClelland & Maier

[57] ABSTRACT

An optical disc substrate made of a polycarbonate containing from 5 to 100% by weight, based on the total carbonate bond-constituting units, of carbonate bond-constituting units having the formula:

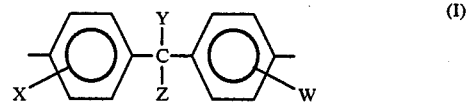

wherein each of Y and Z is a hydrogen atom or an aliphatic hydrocarbon group having from 1 to 6 carbon atoms, and each of X and W is an aliphatic hydrocarbon group having from 1 to 6 carbon atoms.

6 Claims, No Drawings

OPTICAL DISC SUBSTRATE MADE OF A COPOLYCARBONATE

The present invention relates to an optical disc substrate made of a polycarbonate. More particularly, it relates to a material for an optical substrate having excellent optical properties, particularly a material useful for the preparation of an optical disc substrate having excellent transparency and a minimum optical distortion.

A molded product to be used as an optical disc substrate, such as a molded product in the form of a plate or sheet, is required to be transparent and to have a minimum optical distortion. Particularly when used as an optical information material with use of digital signals, such as a digital audio disc, a digital video disc or a disc intended for optical readout or writing in, the requirement for transparency is extremely strict, and with respect to the optical distortion, it is required that the double refraction of a molded product be not higher than $5 \times 10^{-5}$.

It is common to employ injection molding as a simple method for molding a product of this type. However, as a method to minimize the optical distortion, it is common to raise the molten resin temperature to improve the melt flow characteristics. However, if the molten resin temperature is raised, various problems are likely to occur which from the thermal deterioration of the resin. Therefore, such a method does not provide a satisfactory solution to the problem.

As a result of extensive research for a process for producing a molded product having excellent transparency and a minimum optical distortion, it has been found possible to produce a molded material which has excellent transparency and a minimum optical distortion by using a certain specific polycarbonate, whereby the abovementioned problem inherent to the conventional technique can be solved.

Namely, the present invention provides an optical disc substrate made of a polycarbonate containing from 5 to 100% by weight, based on the total carbonate bond-constituting units, of carbonate bond-constituting units having the formula:

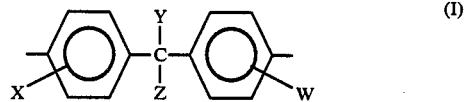
(I)

wherein each of Y and Z is a hydrogen atom or an aliphatic hydrocarbon group having from 1 to 6 carbon atoms, and each of X and W is an aliphatic hydrocarbon group having from 1 to 6 carbon atoms.

Now, the present invention will be described in detail with reference to the preferred embodiments.

For the purpose of the present invention, the "carbonate bond" is a unit of the formula:

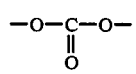

which is obtained by the reaction of an alcoholic hydroxyl group or a phenolic hydroxyl group with e.g. phosgene. The "carbonate bond-constituting unit" is meant for a structural unit between such carbonate bonds. The structural unit between the carbonate bonds may contain other types of bonds, such as ester bonds, amide bonds, carbamate bonds or ether bonds.

For the production of such a polycarbonate, an interfacial or solution polymerization method may be employed wherein phosgene is blown into at least one diol compound containing a bisphenol compound presenting the structure of the formula I. As the bisphenol compound presenting the structure of the formula I, there may be mentioned, for instance, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3-sec-butylphenyl)propane, and 2,2-bis(4-hydroxy-3-tert-butylphenyl)propane.

The carbonate bond-constituting units introduced by such a bisphenol compound (hereinafter referred to as "carbonate bond units A") are from 5 to 100% by weight, preferably from 5 to 60% by weight, based on the total carbonate bond-constituting units.

As the diol compound to be used for introducing carbonate bond-constituting units other than the carbonate bond units A, there may be mentioned, particularly as an aromatic diol, bis(4-hydroxyphenyl)methane, 1,1-bis(4-hydroxyphenyl)ethane, 1,1-bis(4-hydroxyphenyl)propane, 2,2-bis(4-hydroxyphenyl)propane (i.e. bisphenol A), 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, 2,2-bis(4-hydroxyphenyl)-4-methylpentane, 1,1-bis(4-hydroxyphenyl)phenylmethane, 1,1-bis(4-hydroxyphenyl)cyclohexane, 2,2-bis(4-hydroxy-3-chlorophenyl)propane, 2,2-bis(4-hydroxy-3,5-dimethylphenyl)propane, 4,4'-dihydroxydiphenyl ether, 4,4'-dihydroxydiphenyl sulfone, 4,4'-dihydroxydiphenyl sulfide or a bisphenol compound such as hydroquinone, resorcinol, o-methyl resorcinol or o-cumyl resorcinol. However, a compound capable of presenting carbonate bond-constituting units having the formula:

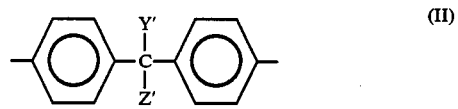
(II)

wherein each Y' and Z' is a hydrogen atom or a hydrocarbon group having from 1 to 10 carbon atoms, particularly bisphenol A, is most suitable as the starting material in view of the reactivity and operational efficiency for the synthesis of the polycarbonate. Further, in some cases, an acid chloride such as isophthalic acid chloride, terephthalic acid chloride, adipic acid chloride or sebacic acid chloride, or a diamine such as piperazine, may be present in combination with bisphenol A.

For the introduction of the carbonate bond units A into the polycarbonate, copolymerization may be employed within a range which satisfies the requirements of the present invention, or polymers separately prepared may suitably be mixed to satisfy the requirements of this invention. In such a case, if the carbonate bond units A are less than 5% by weight relative to the total carbonate bond-constituting units, no adequate improvement in the melt flow characteristics will be obtained, and it will be difficult to constantly obtain a molding material having a minimum optical distortion.

The process for producing a polycarbonate resin from the bisphenol compound for presenting the structure of the formula I and phosgene, may be carried out by adding an aqueous alkaline solution or pyridine as an acid acceptor to a bisphenol in the presence of an inert solvent such as methylene chloride or 1,2-dichloromethane, and introducing and reacting phosgene therewith. When an aqueous alkaline solution is used as the acid acceptor, the reaction rate can be increased by using as the catalyst a tertiary amine such as trimethylamine or triethylamine or a quarternary ammonium compound such as tetrabutyl ammonium chloride or benzyltributyl ammonium bromide. If necessary, a monovalent phenol such as phenol or p-tert-butylphenol may be used as a molecular weight modifier. The reaction is conducted usually at a temperature of from 0° to 100° C. The catalyst may be present from the initial stage, or may be added after the preparation of an oligomer, followed by further polymerization. For the copolymerization of the bisphenol compound for presenting the structure of the formula I with the bisphenol compound for presenting the structure of the formula II, there may be employed (a) a method wherein they may be simultaneously reacted with phosgene and polymerized, (b) a method wherein one of them is firstly reacted with phosgene, and after the reaction has proceeded to some extent, the other compound is introduced for polymerization, or (c) a method wherein the two compounds are reacted with phosgene separately to produce the respective oligomers, which are then reacted for polymerization.

As a method for mixing the polymers separately prepared, there may be mentioned a method wherein the respective powders or granules are mixed, and then melt-mixed by means of e.g. an extruder, a kneader or mixing rolls, or a solution blending method.

The polycarbonate to be used in the present invention preferably has an average molecular weight of 12,000 to 22,000. The average molecular weight here is meant for a value obtained from $\eta sp$ as measured at 20° C. by using a methylene chloride solution containing 6.0 g/liter of the polymer, by calculation in accordance with the following formula 1 and formula 2.

$$\eta sp/c = [\eta](1 + K'\eta sp) \quad (1)$$

$$[\eta] = KM^\alpha \quad (2)$$

In the above formulas, c is the polymer concentration (g/liter), $[\eta]$ is the intrinsic viscosity, $K'$ is 0.28, $K$ is $1.23 \times 10^{-5}$, $\alpha$ is 0.83, and $M$ is the average molecular weight.

Namely, if the average molecular weight is less than 12,000, the mechanical properties will be inferior, and if the average molecular weight exceeds 22,000, it will be difficult to obtain a molding material having a minimum optical distortion.

When the polycarbonate of the present invention is to be molded, it is preferred to add from 0.01 to 2% by weight of a phosphite to the resin, whereby the coloring or the deterioration of transparency due to the decomposition of the resin can be controlled. As such a phosphite, there may be mentioned tributyl phosphite, tris(2-ethylhexyl)phosphite, tridecyl phosphite, tristearyl phosphite, triphenyl phosphite, tricresyl phosphite, 2-ethylhexyldiphenyl phosphite, decyldiphenyl phosphite, tricylohexyl phosphite or distearyl pentaerythrityl diphosphite. Such a phosphite may be incorporated by dry blending, by melt mixing at the time of pelletizing by means of an extruder, or by preparing master pellets having a high phosphite concentration and dry blending them with pellets containing no phosphite.

The polycarbonate thus obtained can be used as the material for an optical disc substrate. The optical disc here includes a disc for replay only such as a compact disc or a laser disc, a write-once type disc useful for a document file, a still image file or a moving image file, and an erasable type disc such as a photomagnetic disc.

The molding material of the present invention can be molded under relatively mild conditions, whereby the double refraction can be reduced, the thermal deterioration of the resin can be prevented, and it is possible to obtain a molded product having excellent transparency and a minimum optical distortion.

Now, the present invention will be described in further detail with reference to Examples. However, it should be understood that the present invention is by no means restricted by these specific Examples.

The Examples illustrate specific manners for the preparation of polycarbonates to be used in the present invention and their oligomers. In the following Examples, the "parts" represents "parts by weight".

The resin obtained in each Example or Comparative Example was, after an addition of 130 ppm of 2-ethylhexyldiphenyl phosphite, molded into a strip having a thickness of 1.2 mm, a width of 1 cm and a length of 5 cm by means of a 0.1 ounce injection molding machine (J 1S manufactured by the Japan Steel Works, Ltd.) under molding conditions identified in Table 1.

At the same time, the apparent melt viscosity $\eta a$ was measured at 280° C. at a shear rate of $10^3$ sec$^{-1}$ by a flow tester and was used as a reference for the melt flow characteristic.

The double refraction was evaluated by the double refraction (hereinafter represented simply by "$\Delta n_2$") measured at the position of 2 cm from the end portion (the inlet direction of the molten resin) of the strip-shaped molded product. The double refraction was measured by Carl Zeiss polarizing microscope.

The data obtained by the Examples are shown in Table 1.

EXAMPLE 1

Preparation of polycarbonate oligomer

| | |
|---|---|
| 16.6% Aqueous solution of a sodium salt of bisphenol A prepared by dissolving bisphenol A in an aqueous sodium hydroxide solution | 100 parts |
| p-tert-Butylphenol | 0.23 part |
| Methylene chloride | 40 parts |
| Phosgene | 7 parts |

A mixture having the above composition was quantitatively supplied to a pipe reactor, and interfacial polymerization was conducted.

The reaction mixture was subjected to liquid separation to obtain a methylene chloride solution containing a polycarbonate oligomer.

The methylene chloride solution of the oligomer thus obtained, was analyzed, and the results were as follows.

| | |
|---|---|
| Oligomer concentration (Note 1) | 24.5% by weight |
| Terminal chloroformate group concentration (Note 2) | 1.3 N |
| Terminal phenolic hydroxyl group | 0.3 N |

-continued

| concentration (Note 3) | |
|---|---|

Note 1:
Measured by evaporation to dryness.
Note 2:
An aniline hydrochloride obtained by the reaction with aniline was measured by neutralization titration with a 0.2 N sodium hydroxide aqueous solution.
Note 3:
The color development when dissolved in an acetic acid solution of titanium tetrachloride was measured by colorimetry at 546 nm.

The oligomer solution obtained by the above process will be referred to as "oligomer solution A".

EXAMPLE 2

Preparation of copolymerized polycarbonate

| Polycarbonate oligomer solution A | 370 parts |
|---|---|
| p-tert-Butylphenol | 1.4 parts |
| Methylene chloride | 300 parts |

The above mixture was charged into a reactor equipped with a stirrer and stirred at 550 rpm. Then, an aqueous solution having the following composition was added:

| 17% Aqueous solution of a sodium salt of 2,2-bis-(4-hydroxy-3-methylphenyl)-propane | 200 parts |
|---|---|
| 25% Aqueous solution of sodium hydroxide | 20 parts |
| 2% Aqueous solution of triethylamine | 2 parts |

Interfacial polymerization was conducted for about 1.5 hours. The reaction mixture was subjected to liquid separation. The methylene chloride solution containing a polycarbonate resin thereby obtained, was washed with water, an aqueous hydrochloric acid solution and then water, and finally methylene chloride was evaporated to obtain the resin.

The average molecular weight of this resin was 14,300, and from the result of the NMR analysis, the copolymerized 2,2-bis(4-hydroxy-3-methylphenyl)propane was found to be 30.5%.

$\Delta n_2$ values at the molding temperatures of 270° C. and 290° C. are shown in Table 1.

EXAMPLE 3

Preparation of copolymerized polycarbonate

| Bisphenol A | 100 parts |
|---|---|
| 2,2-bis-(4-hydroxy-3-methylphenyl)propane | 50 parts |
| p-tert-Butylphenol | 3 parts |
| Pyridine | 250 parts |
| Methylene chloride | 1000 parts |

The above mixture was charged into a reactor equipped with a stirrer and stirred at 500 rpm. Then, 50 parts of phosgene was blown into it over a period of one hour to conduct solution polymerization.

After the completion of the reaction, excess pyridine was neutralized with an aqueous hydrochloric acid solution, and washed with water, an aqueous hydrochloric acid solution and then water, and finally methylene chloride was evaporated to obtain the resin.

The average molecular weight of this resin was 15,100, and from the result of the NMR analysis, copolymerized 2,2-bis(4-hydroxy-3-methylphenyl)propane was found to be 38.5%.

The $\Delta n_2$ values at molding temperatures of 270° C. and 290° C. are shown in Table 1.

EXAMPLE 4

Preparation of copolymerized polycarbonate

| Polycarbonate oligomer solution A | 370 parts |
|---|---|
| p-tert-Butylphenol | 1.0 part |
| Methylene chloride | 300 parts |

The above mixture was charged into a reactor equipped with a stirrer and stirred at 550 rpm. Then, an aqueous solution having the following composition was added:

| 17% Aqueous solution of a sodium salt of 2,2-bis(4-hydroxy-3-isopropylphenyl) propane | 200 parts |
|---|---|
| 25% Aqueous solution of sodium hydroxide | 20 parts |
| 2% Aqueous solution of triethylamine | 2 parts |

Interfacial polymerization was conducted for about 1.5 hours. Then, the reaction mixture was subjected to liquid separation. The methylene chloride solution containing a polycarbonate resin thereby obtained, was washed with water, an aqueous hydrochloric acid solution and then water, and finally methylene chloride was evaporated to obtain the resin.

The average molecular weight of this resin was 14,600, and from the result of the NMR analysis, copolymerized 2,2-bis(4-hydroxy-3-isopropylphenyl)propane was found to be 28.5%.

The $\Delta n_2$ values at molding temperatures of 260° C. and 290° C. are shown in Table 1.

EXAMPLE 5

Preparation of polycarbonate oligomer

| 2,2-bis(4-hydroxy-3-sec-butylphenyl)-propane | 100 parts |
|---|---|
| Sodium hydroxide | 35 parts |
| Water | 700 parts |
| Methylene chloride | 385 parts |

The mixture was charged into a reactor equipped with a stirrer and stirred at 800 rpm. Then, 43 parts of phosgene was blown into it over a period of one hour to conduct interfacial polymerization. After the completion of the reaction, the methylene chloride solution containing a polycarbonate oligomer was obtained, and analyzed in the same manner as in Example 1. The results were as shown below.

| Oligomer concentration | 23.5% by weight |
|---|---|
| Terminal chloroformate group concentration | 0.40 N |
| Terminal phenolic hydroxyl group concentration | 0.050 N |

The oligomer solution obtained by the above process will be referred to as "oligomer solution B".

EXAMPLE 6

Preparation of copolymerized polycarbonate

| | |
|---|---|
| Polycarbonate oligomer solution A | 200 parts |
| Polycarbonate oligomer solution B | 43 parts |
| p-tert-Butylphenol | 0.5 part |
| Methylene chloride | 125 parts |

The above mixture was charged into a reactor equipped with a stirrer and stirred at 550 rpm. Then, an aqueous solution having the following composition was added:

| | |
|---|---|
| 12.5% Aqueous solution of sodium hydroxide | 88 parts |
| 2% Aqueous solution of triethylamine | 1.2 parts |

Interfacial polymerization was conducted for 3 hours. The reaction mixture was subjected to liquid separation. The methylene chloride solution containing a polycarbonate resin thereby obtained, was washed with water, an aqueous hydrochloric acid solution and then water, and finally methylene chloride was evaporated to obtain the resin.

The average molecular weight of this resin was 15,000.

The $\Delta n_2$ values at molding temperatures of 260° C. and 285° C. are shown in Table 1.

COMPARATIVE EXAMPLE 1

Preparation of polycarbonate

| | |
|---|---|
| Polycarbonate oligomer solution A | 160 parts |
| p-tert-Butylphenol | 0.7 part |
| Methylene chloride | 130 parts |

The above mixture was charged into a reactor equipped with a stirrer and stirred at 550 rpm. Then, an aqueous solution having the following composition was added:

| | |
|---|---|
| 16.6% Aqueous solution of a sodium salt of bisphenol A | 80 parts |
| 25% Aqueous solution of sodium hydroxide | 8 parts |
| 2% Aqueous solution of triethylamine | 1 part |

Interfacial polymerization was conducted for about 1.5 hours. The reaction mixture was subjected to liquid separation. The methylene chloride solution containing a polycarbonate resin thereby obtained, was washed with water, an aqueous hydrochloric acid solution and then water, and finally methylene chloride was evaporated to obtain the resin.

The average molecular weight of this resin was 17,400.

The $\Delta n_2$ values at molding temperatures of 320° C. and 350° C. are shown in Table 1.

COMPARATIVE EXAMPLE 2

Preparation of polycarbonate

A polycarbonate was prepared in the same manner as in Comparative Example 1 except that the amount of p-tert-butylphenol was changed to 1.3 parts.

The average molecular weight of this resin was 14,700.

The $\Delta n_2$ values at molding temperatures of 290° C. and 320° C. are shown in Table 1.

COMPARATIVE EXAMPLE 3

Preparation of copolymerized polycarbonate

| | |
|---|---|
| Bisphenol A | 60 parts |
| 2,2-bis(4-hydroxyphenyl)-4-methyl-pentane | 40 parts |
| p-tert-Butylphenol | 2.6 parts |
| Pyridine | 180 parts |
| Methylene chloride | 950 parts |

The above mixture was charged into a reactor equipped with a stirrer and stirred at 500 rpm. Then, 40 parts of phosgene was blown into it over a period of one hour to conduct solution polymerization.

After the completion of the reaction, excess pyridine was neutralized by an aqueous hydrochloric acid solution, and the product was washed with water, an aqueous hydrochloric acid solution and then water, and finally methylene chloride was evaporated to obtain the resin.

The average molecular weight of this resin was 14,200. From the result of the NMR analysis, copolymerized 2,2-bis(4-hydroxyphenyl)-4-methylpentane was found to be 39.0%.

The $\Delta n_2$ values at molding temperatures of 290° C. and 320° C. are shown in Table 1.

TABLE 1

| | Average molecular weight | $\eta a$(poise) | Molding temperature (°C.) | $\Delta n_2 \times 10^4$ |
|---|---|---|---|---|
| Example 2 | 14,300 | $1.0 \times 10^3$ | 270 | 3.3 |
| | | | 290 | 2.0 |
| Example 3 | 15,100 | $1.0 \times 10^3$ | 270 | 3.2 |
| | | | 290 | 2.0 |
| Example 4 | 14,600 | $0.8 \times 10^3$ | 260 | 3.0 |
| | | | 290 | 1.8 |
| Example 6 | 15,000 | $0.9 \times 10^3$ | 260 | 3.0 |
| | | | 285 | 1.9 |
| Comparative Example 1 | 17,400 | $2.5 \times 10^3$ | 320 | 4.5 |
| | | | 350 | 3.4 |
| Comparative Example 2 | 14,700 | $1.5 \times 10^3$ | 290 | 4.0 |
| | | | 320 | 2.5 |
| Comparative Example 3 | 14,200 | $1.4 \times 10^3$ | 290 | 4.1 |
| | | | 320 | 2.6 |

It is evident from Table 1 that the copolymerized polycarbonates of the present invention can be molded under mild molding conditions to reduce the double refraction, while the polycarbonates of the Comparative Examples require extremely high molding temperatures to reduce $\Delta n_2$.

What is claimed is:

1. A transparent optical disc substrate having a double refraction of not greater than $5 \times 10^{-5}$ prepared from a polycarbonate containing at least 5 wt.%, based on the total carbonate bond-constituting units of the polycarbonate, of (I) carbonate bond-constituting units of the formula:

wherein each of Y and Z is hydrogen, or an aliphatic hydrocarbon group having from 1 to 6 carbon atoms, and each of X and W is an aliphatic hydrocarbon group having from 1 to 6 carbon atoms, and (II) carbonate bond-constituting units of the formula:

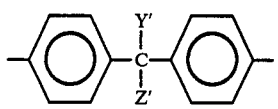

wherein each of Y' and Z' is hydrogen or a hydrocarbon group having from 1 to 10 carbon atoms in an amount which effectively aids in minimizing the optical distortion of the substrate.

2. The optical disc substrate according to claim 1, wherein said polycarbonate contains from 5 to 60% by weight, based on the total carbonate bond-constituting units, of the carbonate bond-constituting units of formula I.

3. The optical disc substrate according to claim 1, wherein the carbonate bond-constituting units of formula I are derived from a bisphenol selected from the group consisting of 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3-sec-butylphenyl)propane and 2,2-bis(4-hydroxy-3-tert-butylphenyl)propane.

4. The optical disc substrate according to claim 1, wherein the units of formula II are derived from bisphenol A.

5. The optical disc substrate according to claim 1, wherein the polycarbonate is produced by reacting phosgene with a bisphenol in the presence of an acid acceptor and an inert solvent.

6. The optical disc substrate according to claim 1, wherein the polycarbonate has an averge molecular weight of from 12,000 to 22,000 as calculated from the reduced viscosity ($\eta_{sp}$) as measured at 20° C. in a methylene chloride solution containing 6.0 g/l of the polymer.

* * * * *